United States Patent

[11] 3,631,615

| [72] | Inventors | Harold L. Reinsma<br>Dunlap;<br>James E. Gee, Washington, both of Ill. |
|---|---|---|
| [21] | Appl. No. | 819,218 |
| [22] | Filed | Apr. 25, 1969 |
| [45] | Patented | Jan. 4, 1972 |
| [73] | Assignee | Caterpillar Tractor Co.<br>Peoria, Ill. |

[54] CRAWLER TRACTOR-SCRAPER COMBINATION
5 Claims, 3 Drawing Figs.

[52] U.S. Cl. .................................................. 37/126 R, 180/9.2 R, 180/9.5
[51] Int. Cl. .................................................. B62d 55/06, B62d 55/08, E02f 3/62
[50] Field of Search .................................................. 37/124, 126–129, 117.5; 305/16, 22; 180/9.44, 9.46, 9.5, 9.52, 9.54, 9.2, 9.4, 9.62, 9.64, 9.5; 280/423, 490, 492, 496

[56] References Cited
UNITED STATES PATENTS

| 1,153,570 | 9/1915 | Price | 180/9.62 X |
| 1,353,945 | 9/1920 | Blewett | 180/9.5 |
| 3,074,449 | 1/1963 | Bertelsen | 180/9.62 |
| 1,258,288 | 3/1918 | Wickersham | 305/22 |
| 1,503,616 | 8/1924 | Wickersham | 180/9.5 |
| 2,922,237 | 1/1960 | Harrison et al. | 37/126 |
| 3,142,352 | 5/1964 | Johansson | 305/22 |
| 3,183,609 | 5/1965 | Le Tourneau | 37/127 |
| 3,190,017 | 6/1965 | Rockwell | 37/129 |
| 3,289,779 | 12/1966 | Feucht | 180/9.5 |
| 3,360,281 | 12/1967 | Allen | 180/9.4 |
| 3,435,908 | 4/1969 | Sunderlin et al. | 37/117.5 X |
| 3,496,844 | 2/1970 | Evans | 37/129 |

*Primary Examiner*—Robert E. Pulfrey
*Assistant Examiner*—Clifford D. Crowder
*Attorney*—Fryer, Tjensvold, Feix, Phillips & Lempio

ABSTRACT: In a crawler tractor-scraper combination, tractors having tracks independently supported at low, centrally located pivots by laterally extending yokes. Such tractors are positioned, at each end of a scraper and a chain of such tractor scrapers using three or more tractors and two or more scrapers may be formed.

INVENTORS
HAROLD L. REINSMA
JAMES E. GEE

ATTORNEYS

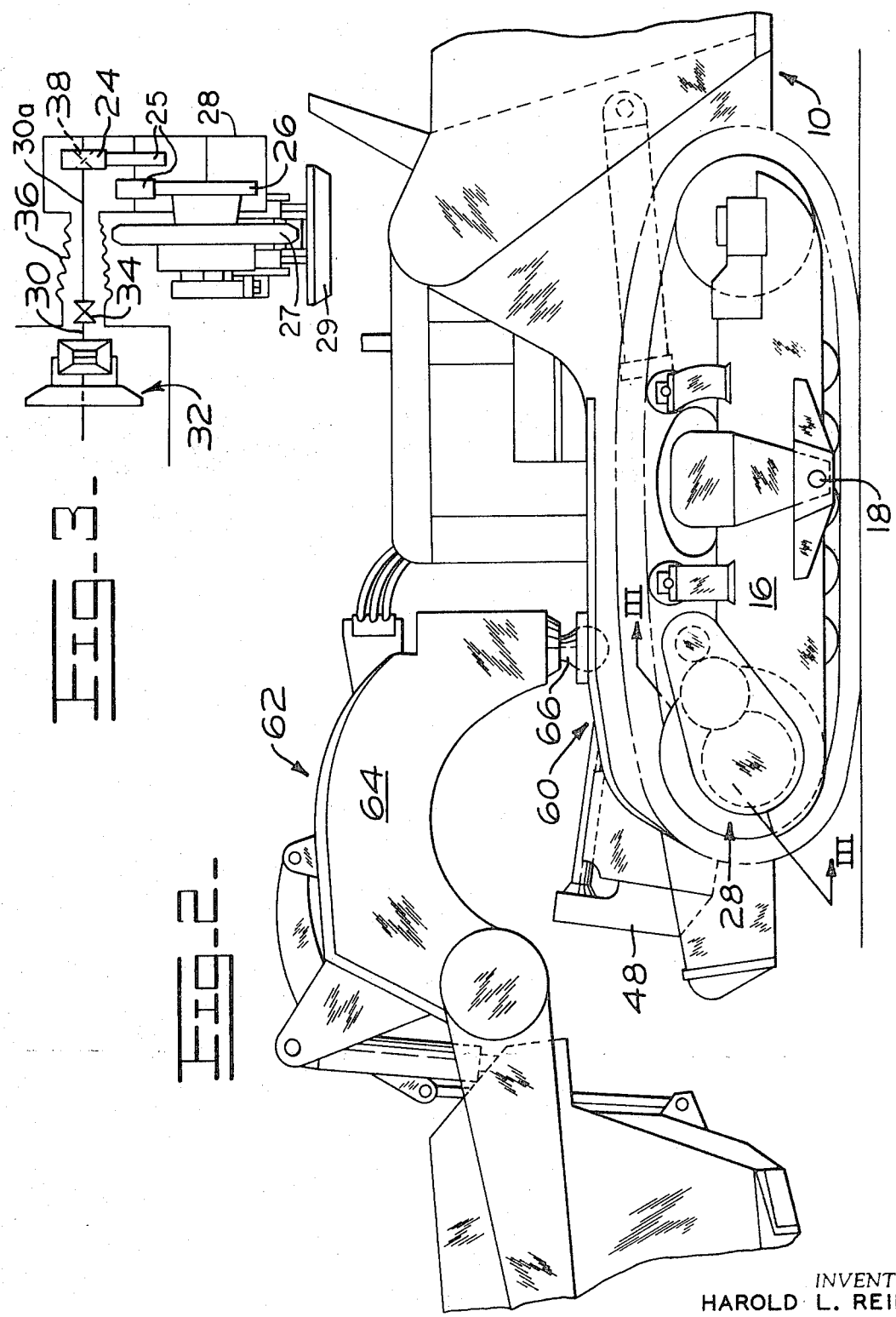

CRAWLER TRACTOR-SCRAPER COMBINATION

BACKGROUND AND SUMMARY OF THE INVENTION

This invention relates generally to a crawler tractor-scraper combination having optimum machine balance, maximum traction, and increased track life. The utilization of the track support system disclosed here, together with a longitudinally fixed scraper hitch, produces an exceptionally stable ride for the tractor and the operator.

In the present invention, the tractors utilized to motivate scrapers embody a "torque-balanced design" by incorporating three specific characteristics into the design configuration. First, the pivot for the track roller frame has been positioned as low as possible for a low center of gravity. This arrangement produces a near optimum tractive effort. Second, the pivot has been placed at, or slightly ahead of, the geometric center of the track for equal weight distribution of the tracks. If the pivot location were raised substantially above ground, the location would also have to be moved forward to produce a balanced system with the same amount of torque. Third, the torque introduced into the tracks by the sprocket is of such value that the moments about the pivot connection for the track roller frame balance and there are not resultant moments about the pivot connection.

It is, therefore, an object of this invention to provide an improved tractor-trailer machine wherein the trailer is a scraper.

It is also an object of this invention to provide such a machine wherein the tractor is a crawler tractor.

It is also an object hereof to provide such a machine wherein such a tractor is mounted at each end of the scraper.

It is a further object of this invention to provide such a machine wherein any number of scrapers may be utilized, in a train, the train having a tractor at the forward end of the first scraper, a tractor at the rear end of the last scraper, and tractors intermediate of and interconnecting all of the scrapers.

Other objects and advantages of the present invention will become apparent from the following description and claims as illustrated in the accompanying drawings which, by way of illustration, show a preferred embodiment of the present invention and principles thereof and what is now considered to be the best mode contemplated for applying these principles. It is recognized that other embodiments of the invention utilizing the same or equivalent principles may be used, and structural changes may be made as desired by those skilled in the art, without departing from the present invention and purview of the appended claims.

BRIEF DESCRIPTION OF THE DRAWINGS

FIG. 2 is a side elevation of a tractor which is intermediate two successive scrapers; and FIG. 3 is a schematic illustration of the tractor drive train, taken along a line III—III of FIG. 2.

DETAILED DESCRIPTION

Figure 1:
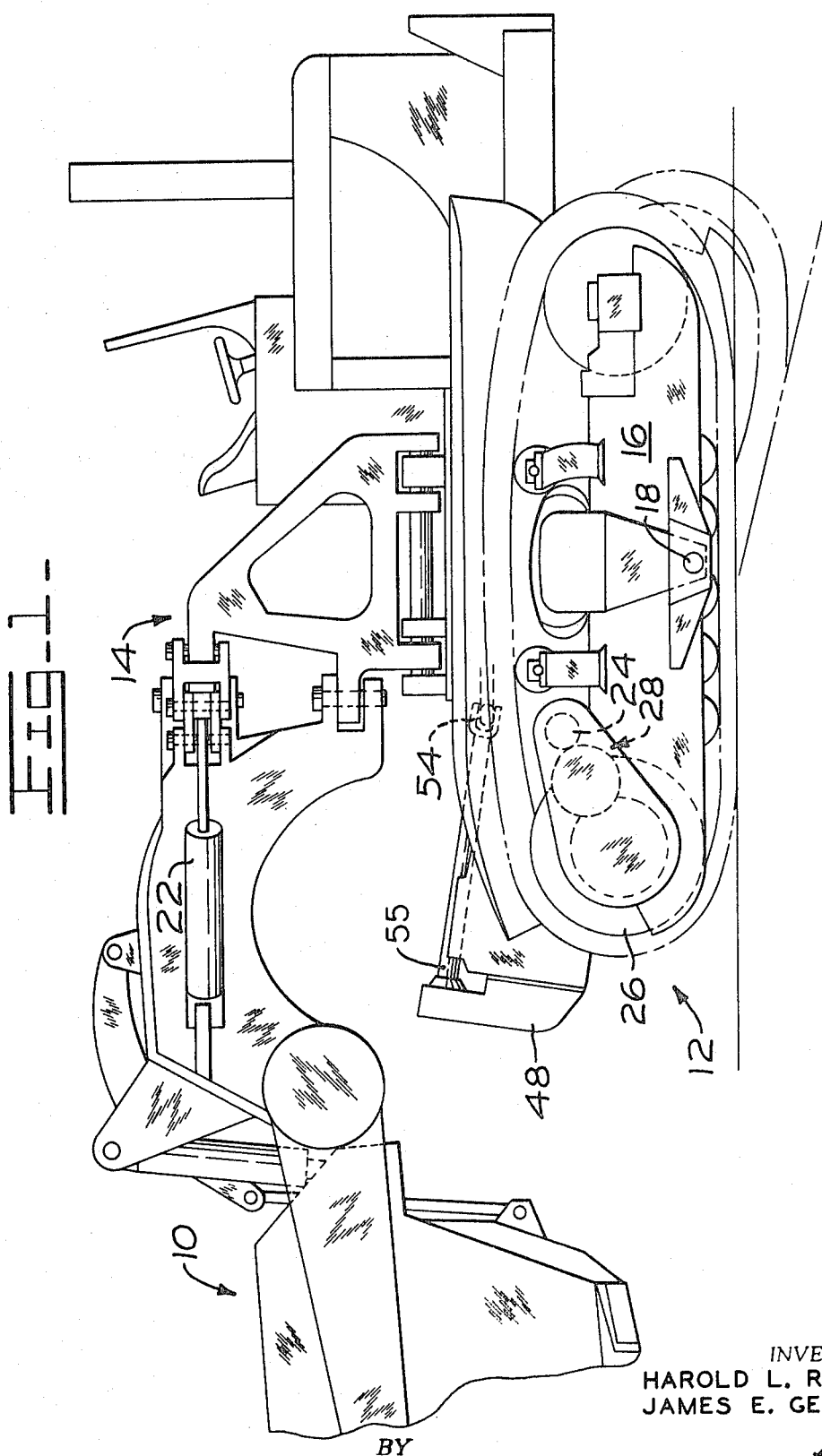
FIG. 1 is a side elevation of a tractor-scraper combination, according to the present invention, the tractor being a lead tractor.

Referring now to the drawings in greater detail, as shown in FIG. 1 a scraper 10 is mounted, at the forward end thereof, on the rear portion as a tractor 12, by means of a longitudinally fixed, transversely oscillatable hitch assembly 14. Although any hitch assembly having such characteristics may be utilized, an example of such an assembly has been shown in copending U.S Pat. application Ser. No. 786,022, filed Dec. 23, 1968, now U.S. Pat. No. 3,565,460 and assigned to the assignee hereof.

Tractor 12 is a track-type vehicle with a modified track roller frame 16 in which the track rollers are resiliently supported in a manner such as that shown in U.S. Pat. No. 3,336,087.

A pivot 18 for the track roller frame is located at a low position and slightly ahead of the geometric center of the track to achieve an equal weight distribution and low center of gravity for the tractor-scraper combination. This placement of the pivot also produces a torque balance in the machine.

This torque balance exists because the summation of moments about the pivot point 18 is zero. Basic analysis will show that two major forces act upon the roller frame 16. Each produces a discernible moment about the pivot point 18. Also acting upon the roller frame is the torsional force or torque input from the engine drive shaft. This torque acts upon the track through the sprocket wheel and its magnitude depends upon the particular power plant used.

Assuming that the tractor-scraper is moving forward, the first force is the resultant of a plurality of forces exerted upon the track by the ground over which the track moves. This resultant force, equal to the weight of the vehicle, acts vertically upwardly on the track at a point some distance to the left of the pivot 18 in FIG. 1, when said pivot is slightly ahead of the center of gravity of the tractor. This force produces a clockwise moment about the pivot point 18 which has a magnitude equal to the product of said weight times its distance from the pivot.

The second force acts upon the track horizontally toward the right as shown in FIG. 1, and beneath the pivot 18 to create a counterclockwise moment thereabout. This is the traction force which acts along the earth-engaging portion of the track and which has a magnitude equal to the product of the weight of the tractor and the coefficient of traction for the particular track utilized. The moment arm of this force equals the vertical distance between the ground and the pivot point 18.

Finally, as previously mentioned, the drive torque input to the vehicle produces a moment about the roller frame pivot. This moment is clockwise when the vehicle is moving forward in its normal operating condition and its magnitude is a design factor which depends upon the particular power plant used to drive the vehicle.

Thus, it can be seen that three separate moments act upon the roller frame about the pivot point 18; two are clockwise and the third is counterclockwise. The two clockwise moments are additive and the counterclockwise moment tends to reduce the effect of the other two. Torque balance in the roller frame may be achieved by selecting a position for the pivot point 18 which will yield a moment summation about the pivot point 18 of zero for a given magnitude of drive shaft torque input.

The tracks can oscillate about 15° in each direction about the pivot 18, relative of the tractor 12, so as to permit the vehicle to negotiate rough terrain. In order to permit the track to oscillate about the center of the track frame, a swing axle 30a is employed to power the planetary final drive gears 26 through a suitable gear train 25, 26, etc.

Steering of the machine can be accomplished by the extension and retraction of a pair of steering jacks 22, controlled by suitable hydraulic circuitry.

As shown more clearly in FIG. 1 and in the schematic illustration of FIG. 3, power to the tracks is transmitted from the engine through the usual torque converter to a universal joint 54 and then through an inclined drive shaft 55 into a gear drop box 48 and then down into a rear-mounted transmission. Power from the transmission is then transmitted through the bevel gear differential 32 as shown in FIG. 3. POwer then passes through the drive shaft 30, through the universal joint 34, the swing shaft 30a, and then to the pinion gear 24, which is located on the outboard side of the track sprocket 27. Power is then transmitted to cluster gear 25 and into a final drive gear 26 and finally into the sprocket 27 and track 29. The moveable drive line 30a, which is telescopically adjustable or slip jointed, and the universal joints 34 and 38 are more or less under the track 29 and are, therefore, subjected to mud and other debris which might fall from said track. For this reason, the flexible boot 36 is provided for completely enclosing the drive line and to keep lubricant in and dirt out while permitting the pinion 24 and the universal joint 38 to move relative to the differential 32. Such movement occurs as the roller frame 16 oscillates about its pivot point 18 when traversing uneven ground.

The transmission gear drop box 48, through which power is communicated from the engine to the power train in the rear of the tractor 12, is angled upwardly at the rear of the tractor to afford increased ground clearance while obtaining positive oscillation and thus, improved service life for the universal joint 54 disposed between the engine and transmission. The oscillation provided by angling the transmission permits the bearings to perform their normal load-transmitting function in an efficient manner without failure.

As shown in FIG. 2, a second tractor 60 which, in its track suspension, is identical to the tractor 12, supports the rear end of the scraper 10 and the forward end of an auxiliary powered scraper 62 so as to produce a tractor-scraper "train."

The draft frame 64 of the succeeding scraper 62 may be attached by a ball joint 66 on the deck of the tractor 60. Suitable remote control systems, including air actuated servo valves, can be readily adapted to cooperate with junction blocks in the vicinity of the ball joint and allow quick detachment or assembly of each unit.

Since a crawler tractor vehicle such as this can self-load effectively even in severe work applications and still maintain cycle times which are compatible with vehicles driven by other means, and since tracked vehicles are nearly always required in muddy and rocky areas, this invention provides a true advance in the art of earth-moving equipment.

While only one embodiment of the invention has been described and illustrated, it will be readily obvious to those skilled in the art that a variety of modifications and alterations may be made without exceeding the scope of the following claims.

What is claimed is:

1. An earth-moving vehicle comprising; a scraper means having a front and rear end, a tractor means having a chassis with side means and a central portion therebetween to which is connected one end of said scraper means, a pair of roller frame means independently mounted by separate mounting means on either side means of said chassis, a track means mounted for rotation upon each of said roller frame means, track-driving means for said tractor means, said track-driving means including means mounted upon said roller frame means for movement therewith independent of and relative to said chassis, each of said roller frame means being pendulously mounted on said side means of said chassis by means of a single pivot connection means offset from the geometric center of said track means, said chassis side means extending outboard of each of said roller frame means at the location of each of said pivot connection means.

2. The invention of claim 1 wherein said roller frame means include sprocket means and idler wheel means for driving and supporting said track means upon said roller frame means and for forming said track means into closed, substantially elliptical shapes having geometric centers and wherein said pivot connection means are located vertically upwardly from the ground less than half the distance between the ground and said geometric center.

3. The invention of claim 2 wherein said pivot connection means are also located horizontally at least as far forward as said geometric center.

4. The invention of claim 1 wherein the clockwise and counterclockwise moments about each of said pivot connection means are substantially balanced when said earth-moving vehicle is operated in a forward direction.

5. An earth-moving vehicle comprising; a scraper means having front and rear ends, a tractor means having a chassis means with side means and a central portion therebetween to which is mounted one end of said scraper means, a pair of track means mounting roller frame means independently and by separate means pendulously mounted on either side means of said chassis means by means of a single pivot connection means, said pivot connection means being offset from the geometric center of said track means, the summation of moments about said pivot connection means being zero during forward movement of said earth-moving vehicle in normal operations.

* * * * *